United States Patent
Heibel et al.

(10) Patent No.: US 12,046,386 B2
(45) Date of Patent: Jul. 23, 2024

(54) METHOD FOR PERIODICALLY MEASURING THE TOTAL GAMMA RADIATION ACTIVITY OF A TARGET RADIOISOTOPE BEING PRODUCED INSIDE A NUCLEAR REACTOR CORE

(71) Applicant: Westinghouse Electric Company LLC, Cranberry Township, PA (US)

(72) Inventors: Michael D. Heibel, Broomfield, CO (US); Michael C. Prible, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 240 days.

(21) Appl. No.: 16/878,293

(22) Filed: May 19, 2020

(65) Prior Publication Data
US 2021/0366626 A1    Nov. 25, 2021

(51) Int. Cl.
G21G 1/02        (2006.01)
G01T 1/167       (2006.01)
G21C 17/108      (2006.01)
G21C 19/22       (2006.01)
G21C 23/00       (2006.01)

(52) U.S. Cl.
CPC ............... G21G 1/02 (2013.01); G01T 1/167 (2013.01); G21C 17/108 (2013.01); G21C 19/22 (2013.01); G21C 23/00 (2013.01)

(58) Field of Classification Search
CPC ...... G21C 17/10; G21C 17/104; G21C 19/22; G21C 23/00; G21C 1/303; G21C 17/116; G21G 1/02; G01N 2223/32; G01N 2223/321

USPC ................................. 376/202, 254, 340–345
See application file for complete search history.

(56) References Cited

U.S. PATENT DOCUMENTS

| 3,787,697 A | * | 1/1974 | Shields .................. G01T 3/006 |
| | | | 250/370.04 |
| 7,544,927 B1 | | 6/2009 | Watschenko-Borho |
| 8,681,920 B2 | | 3/2014 | Heibel et al. |
| | | | (Continued) |

FOREIGN PATENT DOCUMENTS

| CN | 101535835 A | | 9/2009 |
| CN | 106128539 A | * | 11/2016 ............... G21G 1/06 |
| CN | 109313949 A | | 2/2019 |

OTHER PUBLICATIONS

International Search Report and Written Opinion for International PCT Application No. PCT/US2021/032518, dated Apr. 5, 2022.
(Continued)

*Primary Examiner* — Peter M Poon
*Assistant Examiner* — Jinney Kil
(74) *Attorney, Agent, or Firm* — K&L Gates LLP

(57) ABSTRACT

A system for measuring radiation activity of a target radioisotope being produced in a reactor core is disclosed. The system includes a cable assembly and a radiation detector. The cable assembly includes a housing, a target cable configured to position the housing, and a drive cable couplable and decouplable with the target cable. The target radioisotope is positioned within the housing. The drive cable is configured to drive the target cable. The radiation detector is configured to periodically measure the radiation activity of the target radioisotope being produced.

18 Claims, 3 Drawing Sheets

(56) References Cited

U.S. PATENT DOCUMENTS

| | | | |
|---|---|---|---|
| 10,109,380 B2 | 10/2018 | Heibel | |
| 10,755,829 B2 | 8/2020 | Heibel et al. | |
| 2011/0051874 A1* | 3/2011 | Allen | G21C 19/20 376/202 |
| 2011/0051875 A1 | 3/2011 | Bloomquist et al. | |
| 2013/0170927 A1 | 7/2013 | Dayal et al. | |
| 2013/0177125 A1* | 7/2013 | Heinold | G21C 23/00 376/342 |
| 2013/0315361 A1* | 11/2013 | Berger | G21C 19/32 376/202 |
| 2016/0012928 A1* | 1/2016 | Guler | G21G 1/02 376/156 |
| 2018/0019031 A1 | 1/2018 | Heibel et al. | |
| 2018/0336975 A1* | 11/2018 | Heibel | G21C 23/00 |
| 2019/0108921 A1 | 4/2019 | Heibel et al. | |
| 2020/0027618 A1* | 1/2020 | Onderwater | G21G 1/02 |
| 2020/0075187 A1 | 3/2020 | Heibel | |
| 2020/0090824 A1* | 3/2020 | Onderwater | G21K 5/08 |
| 2021/0358647 A1* | 11/2021 | Reese | G06N 3/08 |

OTHER PUBLICATIONS

Search Report for corresponding Taiwain Application No. 110118031, dated Mar. 15, 2022.

\* cited by examiner

METHOD FOR PERIODICALLY MEASURING THE TOTAL GAMMA RADIATION ACTIVITY OF A TARGET RADIOISOTOPE BEING PRODUCED INSIDE A NUCLEAR REACTOR CORE

BACKGROUND

A number of operating reactors employ a Moveable In-core Detector System (MIDS), such as the one described in U.S. Pat. No. 3,932,211, which is hereby incorporated by reference in its entirety herein, to periodically measure the axial and radial power distribution within the core. The moveable detector system generally comprises four, five or six detector/drive assemblies, depending upon the size of the plant (two, three or four loops), which are interconnected in such a fashion that they can assess various combinations of in-core flux thimbles. In some instances, approximately ⅓ of the fuel assemblies in the reactor core host the flux thimbles used to support the core power distribution measurements.

To obtain the thimble interconnection capability, each detector has associated with it a five-path and ten-path rotary mechanical transfer device. A core map is made by selecting, by way of the transfer devices, particular thimbles through which the detectors are driven. To minimize mapping time, each detector is capable of being run at high speed (such as 72 feet per minute) from its withdrawn position to a point just below the reactor core. At this point, the detector speed is reduced to a low speed (such as 12 feet per minute) and the detector is traversed to the top of the core, the direction is reversed, and then the detector is traversed to the bottom of the core. The detector speed is then increased to a high speed (such as 72 feet per minute) and the detector is moved to its withdrawn position. A new flux thimble is selected for mapping by rotating the transfer devices and the above procedure repeated.

FIG. 1 shows the basic system for the insertion of the movable miniature detectors using an in core moveable detector arrangement. Retractable thimbles 10, into which miniature detectors 12 are driven, take the routes approximately as shown. The thimbles 10 are inserted into the reactor core 14 through conduits 22 extending from the bottom of the reactor vessel 16 through the concrete shield area 18 and then up to a thimble seal table 20. Since the movable detector thimbles 10 are closed at the leading (reactor) end, they are dry inside. The thimbles 10, thus, serve as a pressure barrier between the reactor water pressure (2250 psig design) and the atmosphere. Mechanical seals between the retractable thimbles 10 and the conduits 22 are provided at the seal table 20. The conduits 22 are essentially extensions of the reactor vessel 16, with the thimbles 10 allowing the insertion of the in-core instrumentation movable miniature detectors. During operation, the thimbles 10 are stationary and will be retracted only under depressurized conditions during refueling or maintenance operations. Withdrawal of a thimble 10 to the bottom of the reactor vessel 16 is also possible if work is required on the vessel 16 internals.

The drive system for insertion of the miniature detectors 12 includes drive units 24, safety switches 25, limit switch assemblies 26, 5-path rotary transfer devices 28, 10-path rotary transfer devices 30, and isolation valves 32, as shown in FIG. 1. Each drive unit 24 drives a hollow helical wrap drive cable into the core with a miniature detector 12 attached to the leading end of the cable and a small diameter coaxial cable, which communicates the detector 12 output, threaded through the hollow center back to the trailing end of the drive cable.

Commercial power reactors have an abundance of neutrons that do not significantly contribute to the heat output from the reactor used to generate electrical power. As a result, the use of the MIDS flux thimbles 10 allows for the production of irradiation desired neutron activation and transmutation products, such as Co-60, W-188, Ni-63, Bi-213 and Ac-225, or other isotopes used in medical procedures. The valuable radioisotopes that are produced via neutron transmutation require multiple neutron induced transmutation reactions to occur in order to produce the desired radioisotope product, which results in a core residence time of a fuel cycle or more.

In order to precisely monitor the neutron exposure received by the target radioisotope to ensure the amount of activation or transmutation product being produced is adequate, it is necessary to allow an indication of neutron flux in the vicinity of the target material to be continuously measured. Co-owned U.S. patent application Ser. No. 15/210,231, entitled "IRRADIATION TARGET HANDLING DEVICE", now U.S. Patent Application Publication No. 2018/0019031, which is hereby incorporated by reference in its entirety herein, describes an isotope production cable assembly satisfies this consideration.

Currently, the success of the production of a desired minimum amount of a particular radioisotope is not known until the reactor is shut down at the end of the operating cycle and the activity of the desired radioisotope produced is measured after the target material is removed from the reactor core. At this point, there is little that can be done to remedy or compensate for a production activity shortfall. Accordingly, a system and method for periodically measuring activity of the desired radioisotope in the target material prior to the end of the operating cycle is desired. Creation of a methodology and associated equipment that can be used to measure the isotopic activity while the reactor is in operation would provide the flexibility to adjust the reactor operating conditions needed to improve the production of the desired radioisotope, or at least prepare other measures that may be required to achieve satisfactory commercial production results.

SUMMARY

In various embodiments, a system for measuring radiation activity of a target radioisotope being produced in a reactor core is disclosed. The system includes a cable assembly and a radiation detector. The cable assembly includes a housing, a target cable configured to position the housing, and a drive cable couplable and decouplable with the target cable. The target radioisotope is positioned within the housing. The drive cable is configured to drive the target cable. The radiation detector configured to periodically measure the radiation activity of the target radioisotope being produced.

In various embodiments, a method for measuring radiation activity of a target radioisotope being produced in a reactor core using a radiation detector and a cable assembly is disclosed. The cable assembly includes a housing, a target cable configured to position the housing, and a drive cable configured to drive the target cable. The target radioisotope is positioned in the housing. The method includes coupling the drive cable with the target cable, withdrawing the target radioisotope from the reactor core via the drive cable, and measuring the radiation activity of the target radioisotope being produced with the radiation detector.

In various embodiments, a system for measuring radiation activity of a target radioisotope being produced in a reactor core is disclosed. The system includes a cable system and a radiation sensor. The cable system includes an enclosure, a target cable configured to position the enclosure, and a drive cable selectively couplable and decouplable with the target cable. The target radioisotope is positionable within the enclosure. The target cable is movable between an inserted position corresponding to the enclosure being positioned in the reactor core and a retracted position corresponding to the enclosure being positioned outside of the reactor core. The drive cable is configured to drive the target cable between the inserted position and the retracted position. The radiation sensor configured to sense the radiation activity of the target radioisotope being produced.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

Figure 1:
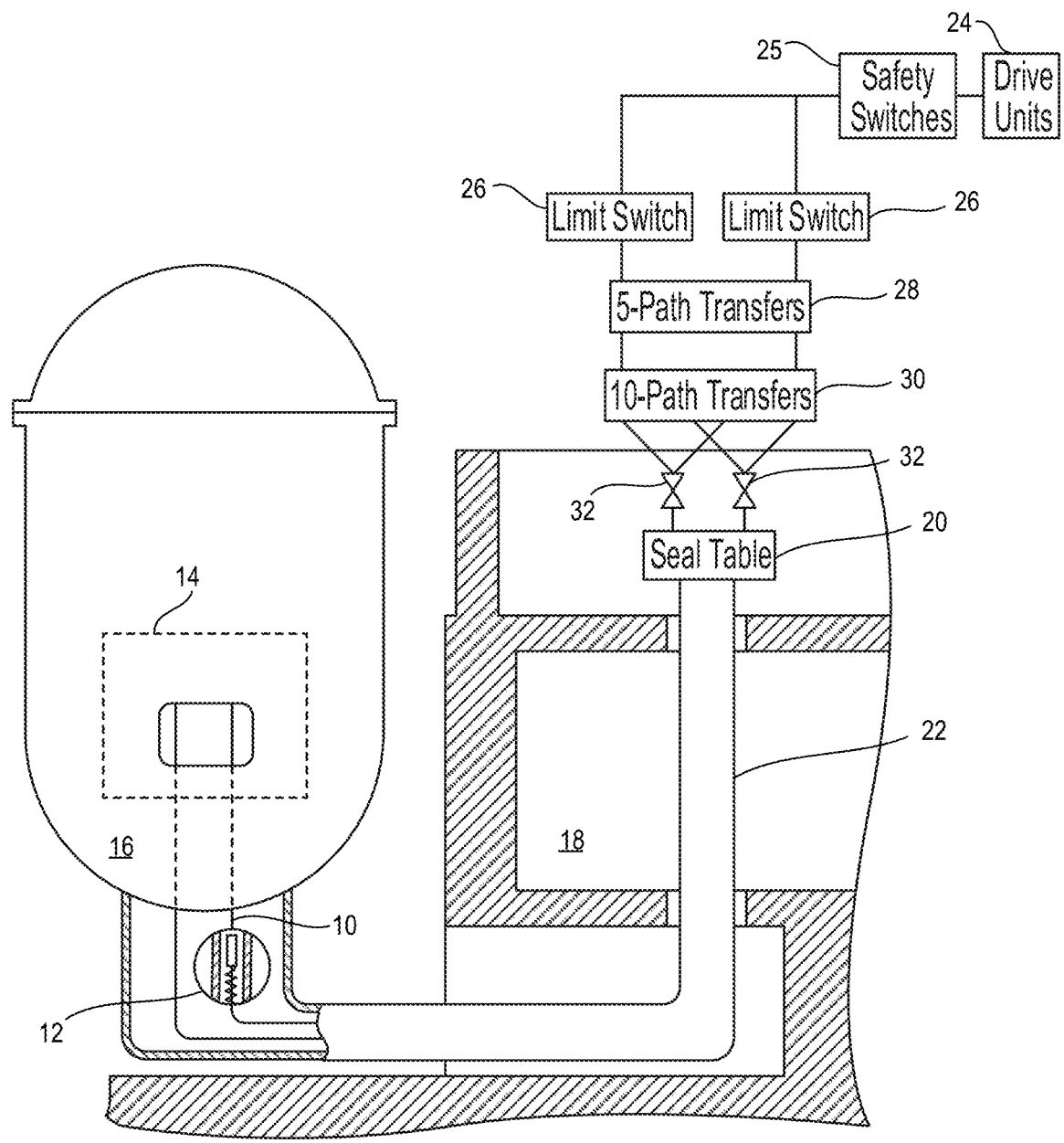
FIG. 1 illustrates a perspective view of an in core moveable detector arrangement.
Figure 2:
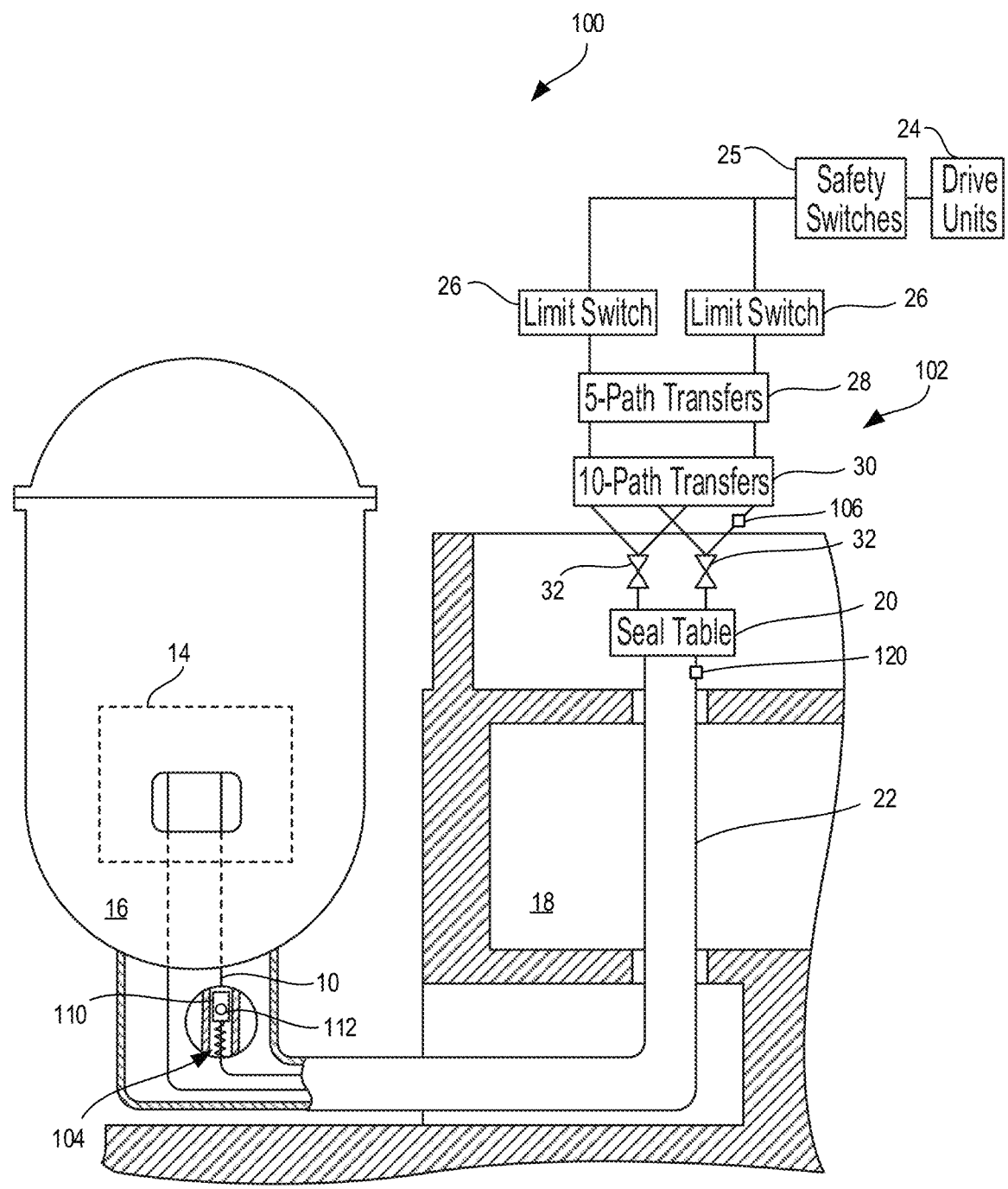
FIG. 2 illustrates a system for measuring radiation activity of a target radioisotope being produced in a reactor core, according to at least one aspect of the present disclosure.

FIG. 2 illustrates a system 100 for measuring radiation activity of a target radioisotope being produced in a reactor core, according to at least one aspect of the present disclosure. The system 100 can include a cable assembly that includes a drive cable 102 and a target cable 104. The drive cable 102 and the target cable 104 can be selectively couplable and decouplable at a coupling interface 106. In one embodiment, the coupling interface 106 can be located just below the 10-path transfer of the MIDS drive. In another embodiment, the coupling interface 106 can be located above the 10-path transfer and below the 5-path transfer. In another embodiment, the coupling interface 106 can be located anywhere above the 5-path transfer. In another embodiment, the coupling interface 106 can be located anywhere below the 10-path transfer and above the seal table 20.

The system 100 can further include a housing, capsule, or enclosure 110. The housing 110 can be any suitable container than has a size and shape that can house a target radioisotope 112 therein. In various embodiments, the housing 110 can be similar to the target material holder described in U.S. Patent Application Publication No. 2018/0019031, the isotope target capsule described in U.S. Pat. No. 10,446,283, or the specimen holder described in U.S. Patent Application Publication No. 2019/0108921, all of which are hereby incorporated by reference in their entireties herein.

In one aspect, the housing 110 can be coupled to the target cable 104 such that movement of the target cable 104 within the thimble 10 moves and positions the housing 110. In one example embodiment, the target cable 104 can be moveable between an inserted position and a retracted position. In one embodiment, the inserted position can correspond to the housing 110 and the target radioisotope 112 being positioned at a location within in the reactor core 14 and the retracted position can correspond to the housing 110 and the target radioisotope 112 being positioned at a location outside of the reactor core 14.

The target cable 104 can position the housing 110 and the target radioisotope 112 at any location within the reactor core 14 in order provide a suitable amount of neutron flux to the target radioisotope 112. In one embodiment, the inserted position can correspond to the housing 110 and the target radioisotope 112 being inserted 25% of the way up the reactor core 14. In another embodiment, the inserted position can correspond to the housing 110 and the target radioisotope 112 being inserted 50% of the way up the reactor core 14. In another example embodiment, the inserted position can correspond to the housing 110 and the target radioisotope 112 being inserted 75% of the way up the reactor core 14. In another embodiment, the inserted position can correspond to the housing 110 and the target radioisotope 112 being 100% of the way up the reactor core 14.

In addition, the target cable 104 can position the housing 110 and the target radioisotope 112 at a location outside of the reactor core 14 within the thimble 10 such that a radiation detector 120, described in more detail below, can sense or detect the radiation activity of the target radioisotope 112 within the housing 110. In one embodiment, the retracted position can correspond to the housing 110 and the target radioisotope 112 being positioned just below the seal table 20. In one embodiment, the retracted position can correspond to the housing 110 and the target radioisotope 112 being positioned just below the reactor core 14. In one embodiment, the retracted position can correspond to the housing 110 and the target radioisotope 112 being positioned at any location along the thimble 10 between the bottom of the reactor core 14 and below the seal table 20. In one embodiment, the retracted position can correspond to the housing 110 and the target radioisotope 112 being positioned at a location next to, or substantially next to, the radiation detector 120.

In one aspect, the target cable 104 can have a length that is defined by the distance from the coupling interface 106 to a desired location corresponding to the target radioisotope 112 being in the inserted position into the reactor core 14. In one example embodiment, the target cable 104 can have a length that is defined by the distance from the coupling interface 106 to a location corresponding to the target radioisotope 112 being inserted 25%, 50%, or 75% of the way up the reactor core.

As described above, the drive cable 102 and the target cable 104 can be selectively couplable and decouplable at the coupling interface 106. In one embodiment, the drive cable 102 and the target cable 104 can be manually coupled and decoupled at the coupling interface 106. In one embodiment, the drive cable 102 and the target cable 104 can be selectively coupled and decoupled at the coupling interface 106 by an external machine in response to a user input. In one embodiment, the drive cable 102 and the target cable 104 can be automatically coupled and decoupled at the coupling interface 106 by an external machine once the coupling interface 106 has reached a predetermined location, such as a location corresponding to the target cable 104 being in the inserted position.

The drive cable 102 can have a length that is defined by the output of the drive unit 24 to the location of the coupling interface 106. When the drive cable 102 is coupled to the target cable 104 at the coupling interface 106, the drive cable 102 can drive the target cable 104 between the inserted position and the retracted position, described above. The drive cable 102 can be coupled to the drive unit 24 through the 5-path transfer device and the 10-path transfer device such that the drive unit 24 can selectively drive the drive cable 102, and as a result, the target cable 104 and target radioisotope 112, between the inserted position and the retracted position.

A limit switch, such as limit switches 26, can be utilized to limit the distances that the drive unit 24 and drive cable 102 can drive the target cable 104. In one example embodiment, the limit switch can automatically halt the drive unit 24 when the target cable 104 has reached the inserted position or the retracted position. In another example embodiment, the limit switch can automatically halt the drive unit 24 when the target housing 110 and the target radioisotope 112 are positioned near the radiation detector 120. In another example embodiment, the limit switch can automatically halt the drive unit 24 when the coupling interface 106 has reached a predefined location, such as just below the 10-path transfer device.

As described above, a radiation detector 120 can sense or detect the radiation activity of the target radioisotope 112 within the housing 110. As shown in FIG. 2, the radiation detector 120 can be positioned at a location outside of the reactor core 14, just below the seal table 20. Other example embodiments are contemplated where the radiation detector 120 is positioned at other suitable locations along the thimble 10 between the reactor core 14 and the seal table 20, such as just below the reactor 14 or a location intermediate the reactor 14 and the seal table 20. As shown in FIG. 2, the radiation detector 120 can be located on one side of the seal table 20, such as just below the seal table 20, while the coupling interface 106 is located on another side of the seal table 20, such as just above the seal table 20 and isolation valves 32.

The radiation detector 120 allows for periodic measurement of the radiation activity of the target radioisotope 112 while being produced. As discussed above, the success of the production of a desired minimum amount of a particular radioisotope is currently not known until the reactor is shut down at the end of an operating cycle and the target radioisotope 112 is removed from the reactor core 14. The radiation detector 112 allows for the radiation activity of the target radioisotope 112 to be measured during a reactor operating cycle. In one embodiment, the radiation detector 120 can measure the radiation activity of the target radioisotope 112 halfway through the operating cycle. In one embodiment, the radiation detector 120 can measure the radiation activity of the target radioisotope 112 a quarter of the way through the operating cycle. In one embodiment, the radiation detector 120 can measure the radiation activity of the target radioisotope 112 at any time in which a reading is desired during an operating cycle.

In one example embodiment, the radiation detector can comprise a Platinum Self-powered Detector (SPD) wrapped in a tight spiral around a selected position on an exterior of the guide thimble 10. In other embodiments, other types of solid-state gamma detectors that would allow the use of gamma spectroscopy methods to more accurately measure the specific gamma intensities associated with the desired product radioisotope can be utilized, such as those described in co-owned U.S. Provisional Patent Application 63/013,859, entitled "A FIXED IN-CORE DETECTOR DESIGN USING SIC SCHOTTKY DIODES CONFIGURED WITH A HIGH AXIAL AND RADIAL SENSOR DENSITY AND ENHANCED FISSION GAMMA MEASUREMENT SENSITIVITY", filed Apr. 22, 2020, which is hereby incorporated by reference in its entirety herein.

As described above, the radiation detector 112 allows for the radiation activity of the target radioisotope 112 to be measured periodically during a reactor operating cycle while the target radioisotope 112 is being produced. The measured radiation activity can be compared to a radiation activity threshold to determine if a desired amount of radiation activity is being achieved. In addition, the measurement can allow the production rate of the desired radioisotope to be compared with an expected result so that appropriate compensation activities can be determined and implemented during the operating cycle of the reactor.

Based on the measured radiation activity, an appropriate compensation activity can include adjusting an operational parameter of the reactor core 14, such as temperature, pressure, or a number or amount of control rods inserted therein, as examples, to improve the production of the target radioisotope 112. In one example embodiment, a control system can automatically adjust an operational parameter of the reactor core based on the measured radiation activity. In another example embodiment, the control system can provide an alert or a readout indicative of the amount of radiation activity measured or sensed by the radiation detector 112. An operator can analyze the readout and make any necessary adjustments to the operation parameter of the reactor core based on the measured radiation activity. In addition, the radiation detector 112 allows an operator to determine if, after a reactor operator cycle, the target radioisotope 112 has reached a sufficient radiation activity threshold and can be removed from the reactor 14, or if the target radioisotope 112 needs to remain in the reactor core for another reactor cycle.

As described above, the drive cable 102 and the target cable 104 can be selectively couplable and decouplable at the coupling interface 106. The ability to decouple the drive cable 102 from the target cable 104 allows for selective coupling when a measurement of the radiation activity of the target radioisotope 112 is desired. When a measurement of the radiation activity of the target radioisotope is not desired, the drive cable 102 can be decoupled from the target cable 104 at the coupling interface 106. When decoupled, the associated 5-path transfer device and 10-path transfer device are free to rotate, allowing the other core locations associated with the 10-path transfer device to be accessed by using other drives operating in Emergency or Common mode. In one embodiment, decoupling the drive cable 102 from the target cable 104 allows the drive cable 102 to be used for other activities, such as controlling and driving a miniature detector 12 into the reactor core 14 to determine radiation activity therein. In addition, the drive cable 102 can be coupled to another, separate and distinct, target cable 104 such that one drive cable 102 can be used to withdraw a different target radioisotope 112 to be measured by a radiation detector 120. This gives the drive cable 102 the ability to control more than one target cable 104 if desired. When a reading of the radiation activity of the target radioisotope 112 is desired, the drive cable 102 can be connected to the target cable 104 at the coupling interface 106. Once coupled, the drive cable 102 can drive the target cable 104 and the associated housing 110 and target radioisotope 112 between the inserted and withdrawn positions.

In one embodiment, the drive cable 102 can couple and decouple with the target cable 104 at the coupling interface 106 when the target cable 104 is in the inserted position. In another example embodiment, the drive cable 102 can couple and decouple with the target cable 104 at the coupling interface 106 when the target cable 104 and is in a position intermediate the inserted position and the retracted position, such as when the target radioisotope 112 is located outside of the reactor core 14, such as just below the reactor core 14 or just below the seal table 20, as examples. In one embodiment, the radiation detector 120 can measure the radiation activity of the target radioisotope 112 when the target cable 104 is in the retracted position. In another example embodiment, the radiation detector 120 can measure the radiation activity of the target radioisotope 112 at a location intermediate the inserted position and retracted position, such as just below the reactor core 14, as an example.

Figure 3:
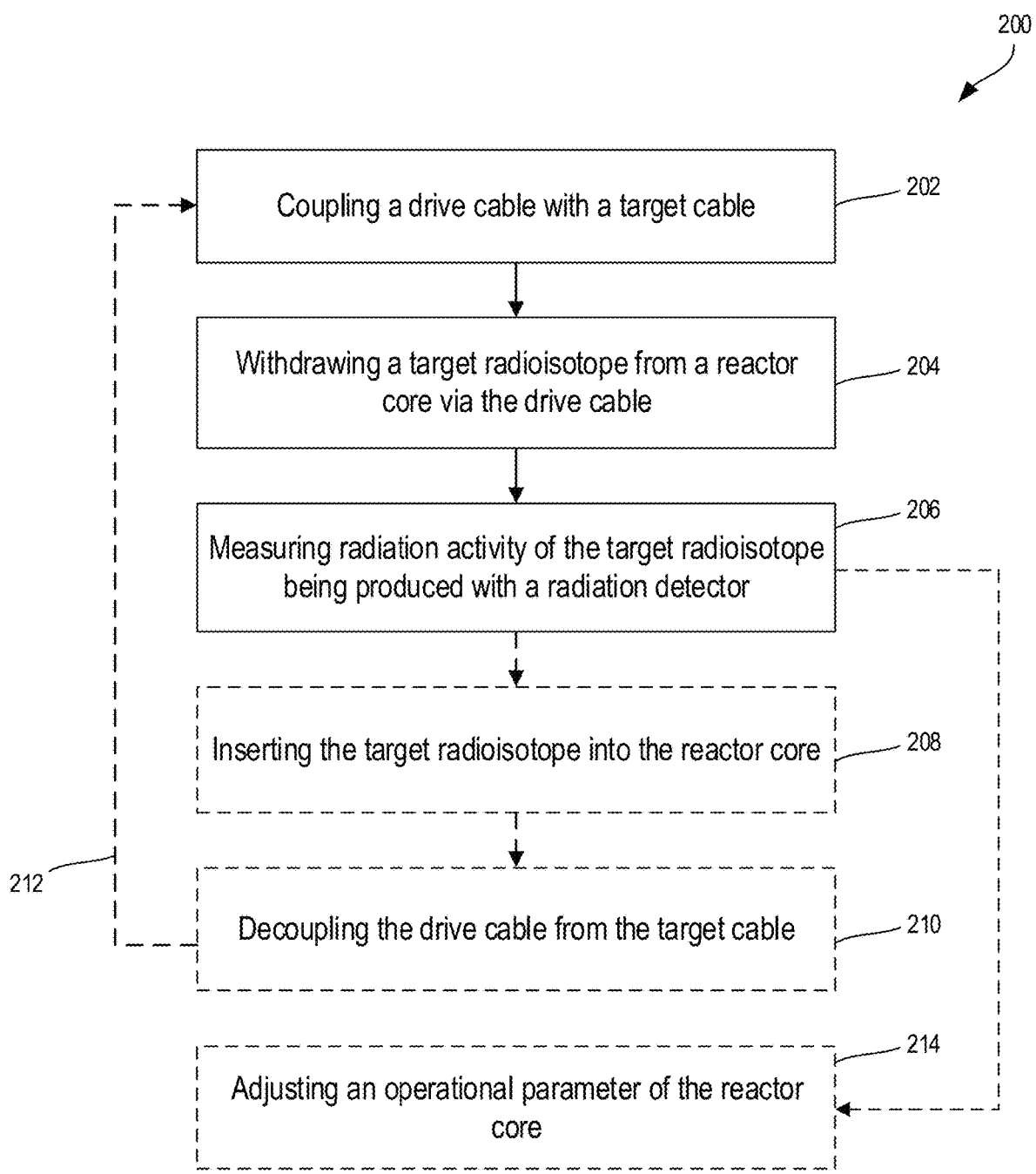
FIG. 3 illustrates a method for measuring radiation activity of a target radioisotope being produced in a reactor core using a radiation detector and a cable assembly, according to at least one aspect of the present disclosure.

Referring now to FIG. 3, a method 200 for measuring radiation activity of a target radioisotope being produced in a reactor core using a radiation detector and a cable assembly is disclosed, according to at least one aspect of the present disclosure. The cable assembly can comprise a housing, a target cable configured to position the housing, and a drive cable configured to drive the target cable. A target radioisotope is positionable in the housing. The method 200 includes coupling 202 the drive cable with the target cable, withdrawing 204 the target radioisotope from the reactor core via the drive cable, and measuring 206 the radiation activity of the target radioisotope being produced with the radiation detector. The method 200 can optionally include inserting 208 the target radioisotope into the reactor core after measuring the radiation activity of the target radioisotope. The method 200 can also optionally include decoupling 210 the drive cable from the target cable after inserting the target radioisotope into the reactor core. The method 200 can also optionally include repeating 212 the method 200 at another time during the reactor operating cycle. The method 200 can optionally also include adjusting 214 an operational parameter of the reactor core based on the measured radiation activity. While shown in FIG. 3 as being completed after the measuring 206 the radiation activity, the adjustment 214 can occur at any other time during the method, such as after inserting 208 the target radioisotope into the reactor core 208 or decoupling 210 the drive cable from the target cable, as an example.

The above described systems and methods can be implemented in any suitable manner in a nuclear reactor plant. For example, while the above-described systems and methods were described as being utilized with the MIDS in Pressure Water Reactors (PWR), the systems and methods can also be implemented utilizing a Traversing Incore Probe System (TIPS) used in Boiling Water Reactors (BWR). The ability to modify an existing system, such as the MIDS or TIPS, with the above described systems and methods provides the advantages described herein above, such as the ability to periodically measure radiation activity of a target radioisotope during a reactor operating cycle, as opposed to after the operating cycle has ended and the target radioisotope has been removed from the reactor core. The above described systems and methods further allow for the ability to adjust operational parameters of the reactor core to compensate for measurements below expectations, which can decrease the number of operating cycles a target radioisotope needs to remain in the reactor core.

Various aspects of the subject matter described herein are set out in the following examples.

Example 1—A system for measuring radiation activity of a target radioisotope being produced in a reactor core, the system comprising a cable assembly and a radiation detector. The cable assembly comprises a housing, wherein the target radioisotope is positioned within the housing, a target cable configured to position the housing, and a drive cable couplable and decouplable with the target cable, wherein the drive cable is configured to drive the target cable. The radiation detector is configured to periodically measure the radiation activity of the target radioisotope being produced.

Example 2—The system of Example 1, wherein the target cable is movable between an inserted position corresponding to the target radioisotope being positioned in the reactor core and a retracted position corresponding to the target radioisotope being positioned outside of the reactor core.

Example 3—The system of Example 2, wherein the drive cable is configured to decouple from the target cable when the target cable is in the inserted position.

Example 4—The system of Examples 2 or 3, wherein the radiation detector is configured to measure the radiation activity of the target radioisotope when the target cable is in the retracted position.

Example 5—The system of any one of Examples 1-4, wherein the radiation detector comprises a platinum self-powered detector.

Example 6—The system of any one of Examples 1-5, wherein the radiation detector is configured to measure the radiation activity of the target radioisotope during a reactor operating cycle.

Example 7—The system of any one of Examples 1-6, wherein a control system is configured to adjust an operation parameter of the reactor core based on the measured radiation activity.

Example 8—A method for measuring radiation activity of a target radioisotope being produced in a reactor core using a radiation detector and a cable assembly, wherein the cable assembly comprises a housing, a target cable configured to position the housing, and a drive cable configured to drive the target cable, and wherein the target radioisotope is positioned in the housing, the method comprising coupling the drive cable with the target cable, withdrawing the target radioisotope from the reactor core via the drive cable, and measuring the radiation activity of the target radioisotope being produced with the radiation detector.

Example 9—The method of Example 8, further comprising inserting the target radioisotope into the reactor core after measuring the radiation activity of the target radioisotope.

Example 10—The method of Example 9, further comprising decoupling the drive cable from the target cable after inserting the target radioisotope into the reactor core.

Example 11—The method of any one of Examples 8-10, wherein the target cable is movable between an inserted position corresponding to the target radioisotope being positioned in the reactor core and a retracted position corresponding to the target radioisotope being positioned outside of the reactor core, wherein coupling the drive cable with the target cable comprises coupling the drive cable with the target cable when the target cable is in the inserted position.

Example 12—The method of any one of Examples 8-11, wherein the target cable is movable between an inserted position corresponding to the target radioisotope being positioned in the reactor core and a retracted position corresponding to the target radioisotope being positioned outside of the reactor core, wherein measuring the radiation activity of the target radioisotope with the radiation detector comprises measuring the radiation activity of the target radioisotope with the radiation detector when the target cable is in the retracted position.

Example 13—The method of any one of Examples 8-12, wherein measuring the radiation activity of the target radioisotope with the radiation detector comprises measuring the radiation activity of the target radioisotope with the radiation detector during a reactor operating cycle.

Example 14—The method of any one of Examples 8-13, further comprising adjusting an operational parameter of the reactor core based on the measured radiation activity.

Example 15—A system for measuring radiation activity of a target radioisotope being produced in a reactor core, the system comprising a cable system and a radiation sensor. The cable system comprises an enclosure, wherein the target radioisotope is positionable within the enclosure, a target cable configured to position the enclosure, wherein the target cable is movable between an inserted position corresponding to the enclosure being positioned in the reactor core and a retracted position corresponding to the enclosure being positioned outside of the reactor core, and a drive cable selectively couplable and decouplable with the target cable, wherein the drive cable is configured to drive the target cable between the inserted position and the retracted position. The radiation sensor is configured to sense the radiation activity of the target radioisotope being produced.

Example 16—The system of Example 15, wherein the drive cable is configured to decouple from the target cable when the target cable is in the inserted position.

Example 17—The system of Examples 15 or 16, wherein the radiation sensor is configured to sense the radiation activity of the target radioisotope when the target cable is in the retracted position.

Example 18—The system of any one of Examples 15-17, wherein the radiation sensor comprises a platinum self-powered detector.

Example 19—The system of any one of Examples 15-18, wherein the radiation sensor is configured to sense the radiation activity of the target radioisotope during a reactor operating cycle.

Example 20—The system of any one of Examples 15-19, wherein a control system is configured to adjust an operation parameter of the reactor core based on the sensed radiation activity.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method for measuring radiation activity of a target radioisotope being produced in a reactor core using a first radiation detector and a cable assembly, wherein the cable assembly comprises a housing, a target cable configured to position the housing, and a drive cable configured to drive the target cable, and wherein the target radioisotope is positioned in the housing, the method comprising:
    coupling the drive cable directly to the target cable at a coupling interface;
    withdrawing the target radioisotope from the reactor core via the drive cable;
    measuring, outside the reactor core with the first radiation detector, the radiation activity of the target radioisotope being produced;
    inserting the target radioisotope into the reactor core after measuring the radiation activity of the target radioisotope;
    after inserting the target radioisotope into the reactor core, decoupling the drive cable from the target cable at the coupling interface while the target radioisotope is inserted in the reactor core;
    after decoupling the drive cable from the target cable, retracting the drive cable while the target radioisotope is inserted in the reactor core;
    coupling the drive cable with a second radiation detector; and
    controlling a position of the second radiation detector in the reactor core with the drive cable.

2. The method of claim 1, wherein the target cable is movable between:
    an inserted position corresponding to the target radioisotope being positioned in the reactor core; and
    a retracted position corresponding to the target radioisotope being positioned outside of the reactor core;
    wherein coupling the drive cable with the target cable comprises coupling the drive cable with the target cable when the target cable is in the inserted position.

3. The method of claim 2, wherein the housing and target radioisotope are positioned at a location next to the first radiation detector and below a thimble seal table in the retracted position.

4. The method of claim 1, wherein the target cable is movable between:
    an inserted position corresponding to the target radioisotope being positioned in the reactor core; and
    a retracted position corresponding to the target radioisotope being positioned outside of the reactor core;
    wherein measuring the radiation activity of the target radioisotope with the first radiation detector comprises measuring the radiation activity of the target radioisotope with the first radiation detector when the target cable is in the retracted position.

5. The method of claim 1, wherein measuring the radiation activity of the target radioisotope with the first radiation detector comprises measuring the radiation activity of the target radioisotope with the first radiation detector during a reactor operating cycle.

6. The method of claim 1, further comprising adjusting an operational parameter of the reactor core based on the measured radiation activity.

7. The method of claim 2, wherein the housing and target radioisotope are inserted 100% of the way in the reactor core in the inserted position.

8. The method of claim 4, wherein the housing and target radioisotope are positioned at a location next to the first radiation detector and below a thimble seal table in the retracted position.

9. The method of claim 1, further comprising providing an alert indicative of the measured radiation activity.

10. The method of claim 1, wherein the first radiation detector comprises a platinum self-powered detector.

11. A method for measuring radiation activity of a target radioisotope being produced in a reactor core using a first radiation sensor and a cable system, wherein the cable system comprises an enclosure, a target cable configured to position the enclosure, and a drive cable configured to position the target cable, and wherein the target radioisotope is positioned in the enclosure, the method comprising:
  coupling the drive cable with the target cable at a coupling interface;
  withdrawing the target radioisotope from the reactor core via the drive cable;
  sensing, outside the reactor core with the first radiation sensor, the radiation activity of the target radioisotope being produced, wherein the sensing occurs during a reactor operating cycle;
  inserting the target radioisotope into the reactor core after sensing the radiation activity of the target radioisotope;
  after inserting the target radioisotope into the reactor core, decoupling the drive cable from the target cable at the coupling interface while the target radioisotope is inserted in the reactor core;
  after decoupling the drive cable from the target cable, retracting the drive cable while the target radioisotope is inserted in the reactor core
  coupling the drive cable with a second radiation sensor; and
  controlling a position of the second radiation sensor in the reactor core with the drive cable.

12. The method of claim 11, further comprising providing a readout indicative of the sensed radiation activity.

13. The method of claim 11, further comprising adjusting an operational parameter of the reactor core based on the sensed radiation activity.

14. A method for measuring radiation activity of a target radioisotope being produced in a reactor core using a first radiation detector and a cable assembly, wherein the cable assembly comprises a housing, a target cable configured to position the housing, and a drive cable configured to drive the target cable, and wherein the target radioisotope is positioned in the housing, the method comprising:
  coupling the drive cable directly to the target cable at a coupling interface located above a thimble seal table;
  withdrawing the target radioisotope to a retracted position outside of the reactor core via the drive cable after coupling the drive cable with the target cable;
  measuring, with the first radiation detector, the radiation activity of the target radioisotope being produced after withdrawing the target radioisotope from the reactor core;
  inserting the target radioisotope to an inserted position inside of the reactor core after measuring the radiation activity of the target radioisotope;
  after inserting the target radioisotope into the reactor core, decoupling the drive cable from the target cable at the coupling interface while the target radioisotope is inserted in the reactor core;
  after decoupling the drive cable from the target cable, retracting the drive cable while the target radioisotope is inserted in the reactor core;
  coupling the drive cable with a second radiation detector; and
  controlling a position of the second radiation detector in the reactor core with the drive cable.

15. The method of claim 14, wherein measuring the radiation activity of the target radioisotope with the first radiation detector comprises measuring the radiation activity of the target radioisotope with the first radiation detector during a reactor operating cycle.

16. The method of claim 14, further comprising adjusting an operational parameter of the reactor core based on the measured radiation activity.

17. The method of claim 1, further comprising:
  coupling the drive cable with a third target cable, wherein the third target cable is configured to position a second housing, and wherein a second target radioisotope is positioned in the second housing;
  withdrawing the second target radioisotope from the reactor core via the drive cable; and
  measuring, outside the reactor core with the first radiation detector, a radiation activity of the second target radioisotope being produced.

18. A method for measuring radiation activity of a target radioisotope being produced in a reactor core using a first radiation detector and a cable assembly, wherein the cable assembly comprises a housing, a target cable configured to position the housing, and a drive cable configured to drive the target cable, and wherein the target radioisotope is positioned in the housing, the method comprising:
  coupling the drive cable with the target cable;
  withdrawing the target radioisotope from the reactor core via the drive cable;
  measuring, outside the reactor core with the first radiation detector, the radiation activity of the target radioisotope being produced;
  inserting the target radioisotope into the reactor core after measuring the radiation activity of the target radioisotope;
  after inserting the target radioisotope into the reactor core, decoupling the drive cable from the target cable while the target radioisotope is inserted in the reactor core; and
  after decoupling the drive cable from the target cable, retracting the drive cable while the target radioisotope is inserted in the reactor core;
  coupling the drive cable with a second radiation detector; and
  controlling a position of the second radiation detector in the reactor core with the drive cable.

* * * * *